Oct. 31, 1933.                    T. JAMES, JR                    1,932,410
                          AUTOMATIC AIR BRAKE SYSTEM
                          Filed May 11, 1928        4 Sheets-Sheet 1
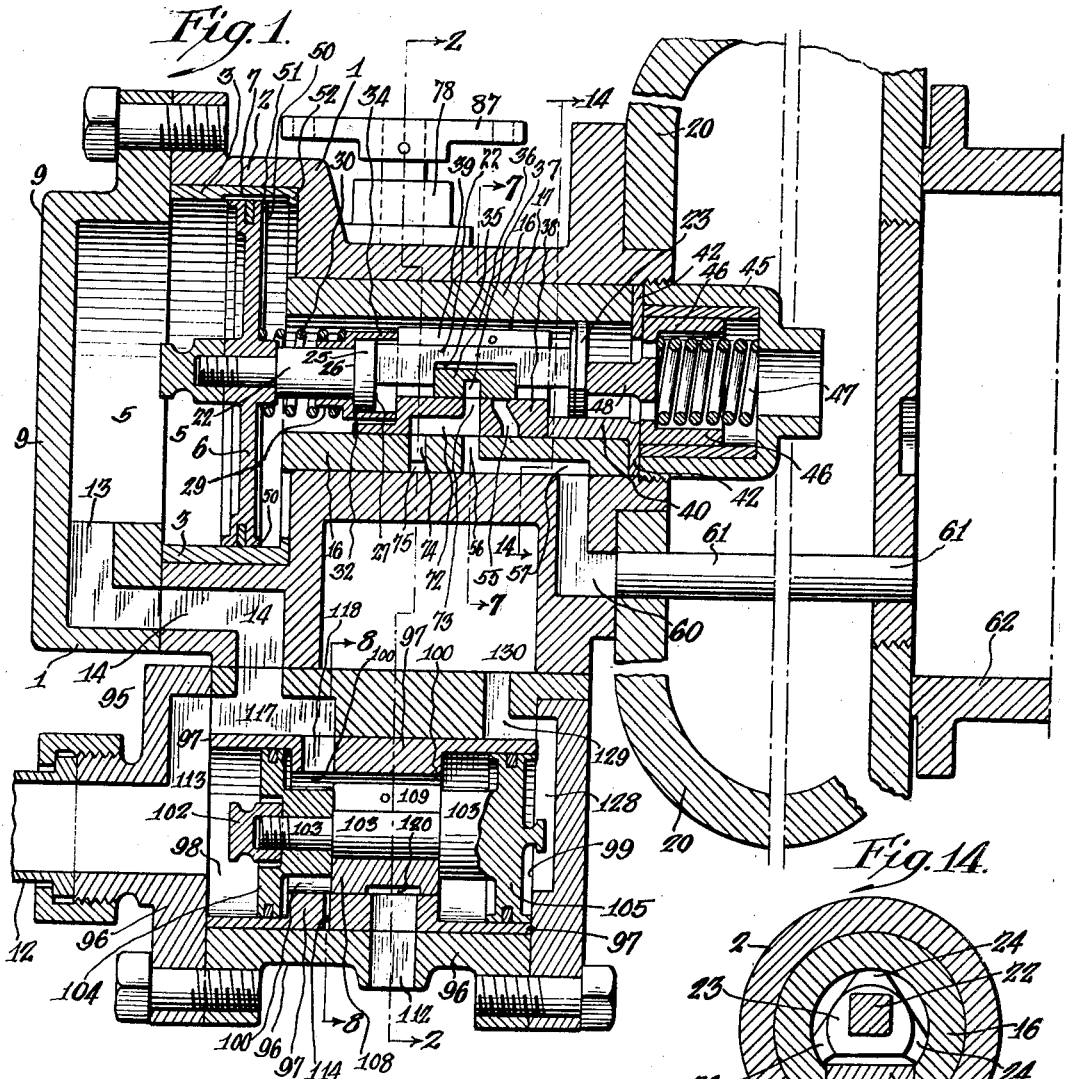
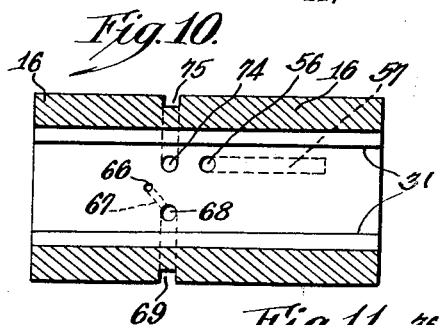
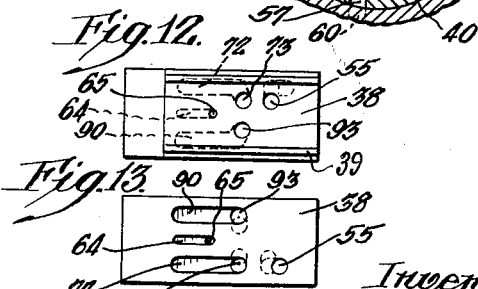
Inventor
Thomas James Jr.
by F. DeWitt Goodwin
Attorney
Witness:
Walter Chung Oct. 31, 1933.  T. JAMES, JR  1,932,410
AUTOMATIC AIR BRAKE SYSTEM
Filed May 11, 1928  4 Sheets-Sheet 2
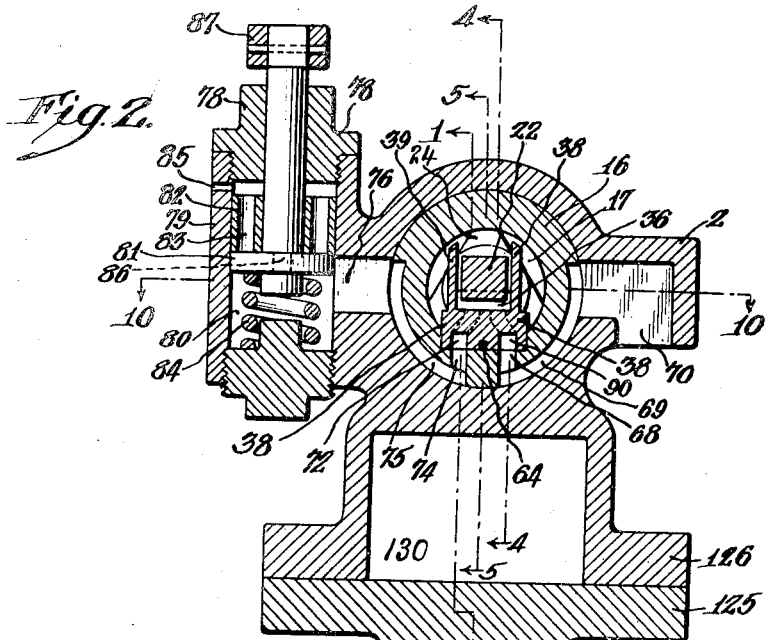
Fig. 2.
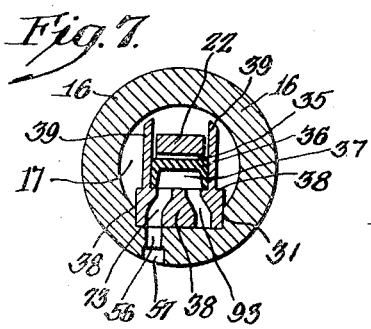
Fig. 7.
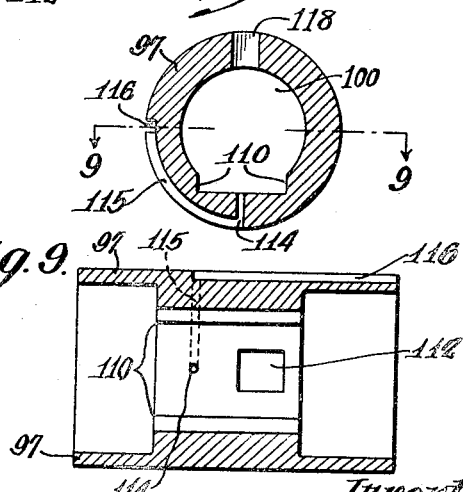
Fig. 8.
Fig. 9.
Witness:
Walter Chism
Inventor:
Thomas James Jr
by H. DeWitt Goodwin
Attorney

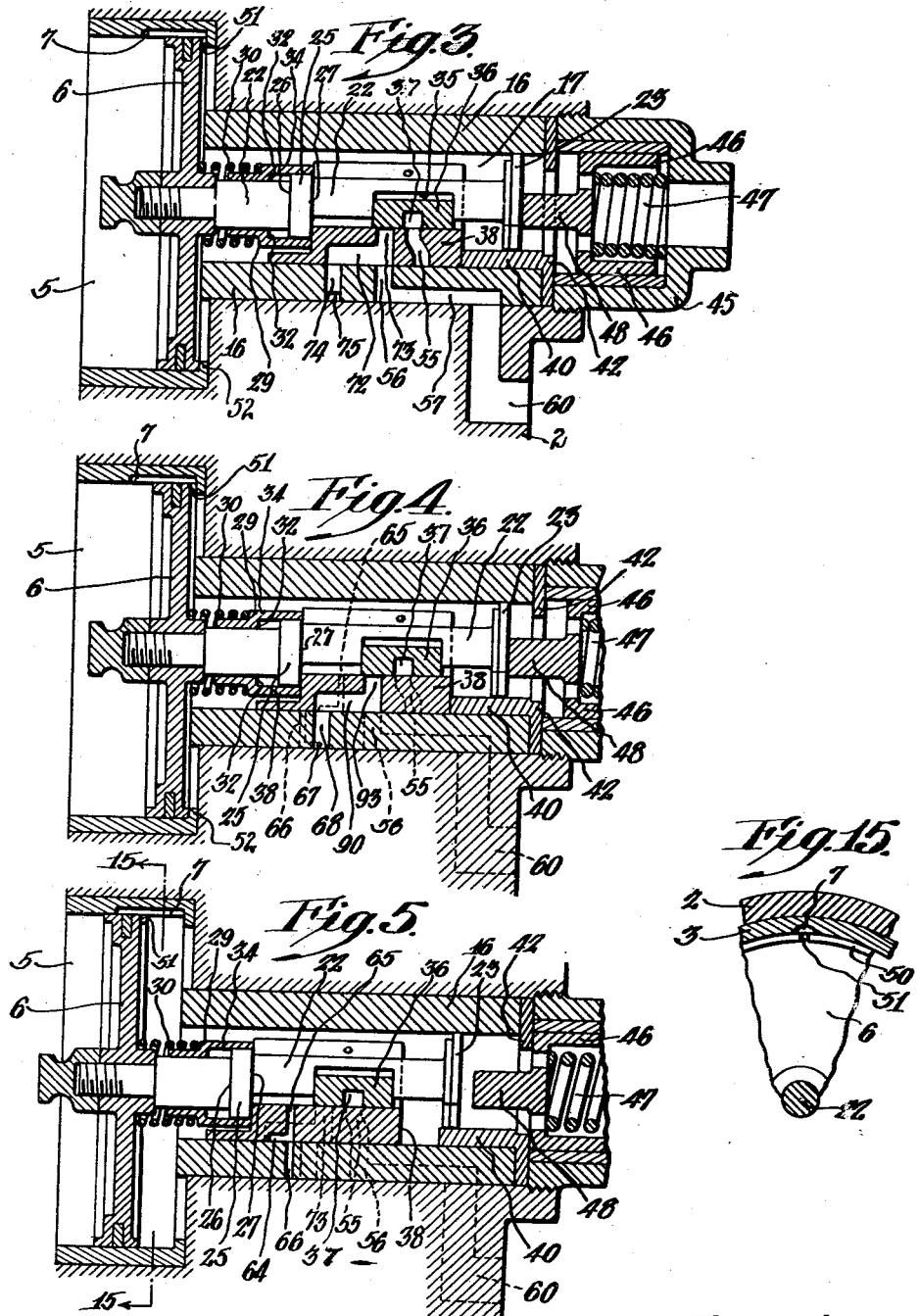

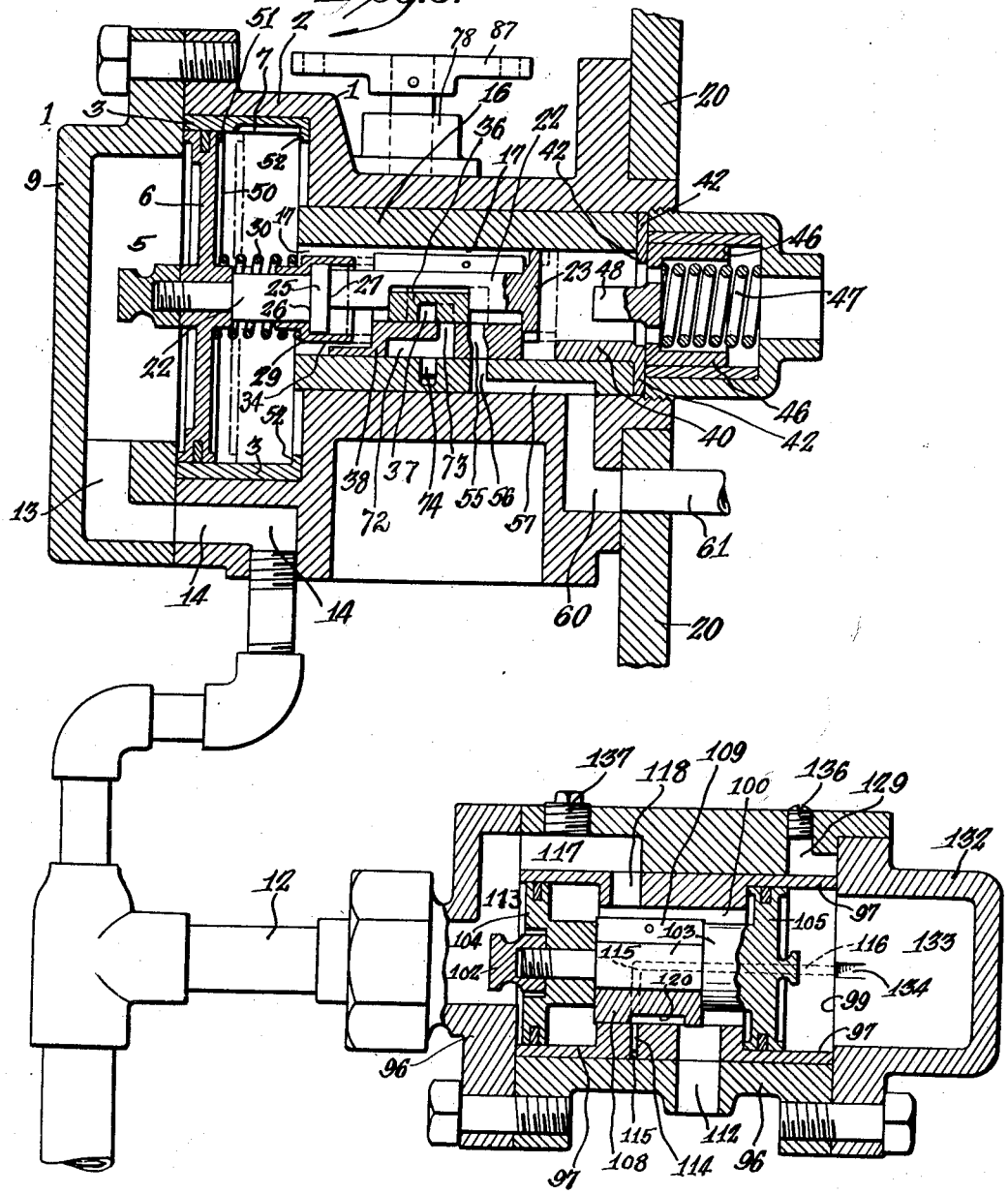

Patented Oct. 31, 1933

1,932,410

UNITED STATES PATENT OFFICE 1,932,410

AUTOMATIC AIR BRAKE SYSTEM

Thomas James, Jr., Philadelphia, Pa.

Application May 11, 1928. Serial No. 276,864

36 Claims. (Cl. 303—78)

My invention relates to improvements in an automatic air brake system.

The object of my invention is to provide novel features for the better operation and control of the air brakes; a further object is to provide a triple valve having a novel form of graduating valve by which the brake cylinder pressure may be retained during the recharging of the auxiliary reservoir; a further object is to so arrange the graduating valve that the brakes may be gradually released, or graduated off, by the operation of the brake valve on the engine which controls the brake pipe pressure; a still further object is to provide novel means for releasing the brakes before recharging the auxiliary reservoir by means of my novel form of graduating valve and the various novel operating parts of the triple valve; a still further object is to provide means in the triple valve for obtaining a simultaneous release of the brakes throughout a train; a still further object is to provide a hand exhaust valve associated with the triple valve by which the brakes on the front end of the train may be released in advance of the brakes upon the rear end of the train or released upon the rear end in advance of those on the front end of the train by setting the hand valves in the closed or open position as desired; a still further object of the invention is to provide means by which a relief port in the triple valve is controlled by the graduating valve for relieving the auxiliary reservoir pressure to reduce the pressure on the operating parts of the triple valve so that the latter may be readily moved into a position to release the brakes and also to sound a warning signal if the triple valve fails to go into release position.

A still further object is to provide a novel form of feed groove in the triple valve for retarding the charging of the auxiliary reservoir under a heavy charging pressure; a still further object is to provide novel means for controlling the piston and graduating valve of the triple valve when graduating the brakes off, and when charging; a still further object is to provide a slide valve in the triple valve having a novel arrangement of the ports; a still further object is to provide a novel form of vent valve for venting the brake pipe, by which a serial venting of the brake pipe pressure may be obtained during an emergency application of the brakes only and preventing such an emergency application when only a service application of the brakes is intended; and a still further object is to provide means by which an effective emergency pressure in the brake cylinder may be obtained after a full service application of the brakes has been made.

These together with various other novel features and arrangement of the parts, constitute my invention, which will be more fully hereinafter described and claimed.

Referring to the accompanying drawings:

Fig. 1 is a vertical longitudinal sectional view of any improved triple valve and the vent valve, as on line 1—1 Fig. 2;

Fig. 2 is a vertical transverse section on line 2—2 Fig. 1;

Fig. 3 is a partial sectional view similar to Fig. 1 showing the parts of the triple valve moved to "changing" position;

Fig. 4 is a partial sectional view on line 4—4 Fig. 2, showing the parts in the same position as in Fig. 3;

Fig. 5 is a partial central sectional view as in line 5—5 Fig. 2, showing the parts in a position to open the relief port from the auxiliary chamber when releasing the brakes;

Fig. 6 is a partial sectional view on line 1—1 Fig. 2, similar to Fig. 1, showing the triple valve, in full lines, in "service" or "emergency" position, and in "lap" position in dotted lines, also showing the vent valve in "emergency" position, and showing a different connection between the vent valve and the triple valve;

Fig. 7 is a transverse section of the bushing, slide valve and graduating valve, as on line 7—7 Fig. 1;

Fig. 8 is a transverse section of the bushing of the vent valve as on line 8—8 Fig. 1;

Fig. 9 is a horizontal section on line 9—9 Fig. 8;

Fig. 10 is a horizontal central sectional view of the bushing, of the triple valve, detached, as on line 10—10 Fig. 2;

Fig. 11 is an inverted plan view of the graduating valve, detached;

Fig. 12 is a detached plan view of the slide valve of the triple valve;

Fig. 13 is an inverted plan view of the slide valve shown in Fig. 12;

Fig. 14 is a transverse sectional view of the bushing of the auxiliary chamber of the triple valve, showing the guide flange on the piston rod, as on line 14—14 Fig. 1, and Fig. 15 is a partial vertical sectional view as on line 15—15 Fig. 5 showing the relative sizes of the feed groove and the retarding feed groove.

Referring to the accompanying drawings in which like reference characters refer to like parts, 1 represents a triple valve comprising a body 2, in which is secured a bushing 3 forming a cylinder or pressure chamber 5 in which is slidably mounted a piston 6. Said bushing 3 is provided with a leakage groove 7.

The body 2 is provided with cap 9 forming an extension to the pressure chamber 5 which is open to the brake pipe side of the piston 6. Said pressure chamber 5 is connected with the brake pipe 12 through passageways 13 and 14 shown in Figs. 1 and 6. Said brake pipe 12 is the standard type now in use in air brake systems for conveying air pressure from the locomotive to the triple valves on the cars throughout a train, which pressure is controlled by a brake valve, not shown in the drawings.

The central portion of the body 2 has secured therein a bushing 16 forming an auxiliary chamber 17 which communicates at one end with said pressure chamber 5 through said leakage groove 7 and at the other end communicates with the auxiliary reservoir 20, which latter is of the standard type now in use on railway cars and other equipment.

The piston 6 is secured to a piston rod 22 which latter is positioned axially in the auxiliary chamber 17. Said rod 22 is provided at its end opposite to the piston 6 with a guide flange 23 and intermediate the piston 6 and said flange 23, said rod is provided with an enlargement 25 forming shoulders 26 and 27 upon opposite faces thereof.

Loosely mounted upon the piston rod 22 is a sleeve 29 which is normally urged against said shoulder 26 by a spring 30 positioned between the sleeve 29 and said piston 6. The sleeve 29 is provided with a stop 32 which takes against said shoulder 26 thus limiting the movement of the sleeve 29 by said spring 30. Said sleeve 29 has a portion 34 which surrounds said enlargement 25 and forms an extension adapted to project beyond the shoulder 27 on said enlargement 25, when said spring 30 moves the sleeve 29 into the normal position shown in Fig. 1, unless the spring 30 is otherwise compressed as shown in Fig. 5.

The piston rod 22 is provided with a recess 35 which is occupied by a graduating valve 36 loosely positioned in said recess 35, and movable longitudinally with the piston rod. Said graduating valve 36 rests upon a slide valve 38, which latter is movable longitudinally in a guide way 31 formed in the bushing 16. The adjacent facing surfaces of the bushing 16, slide valve 38 and graduating valve 36 are finished to form air tight joints, or surfaces, between the same. The slide valve 38 is provided with upwardly extending cheek plates 39 which form guides for the graduating valve 36.

The piston rod guide flange 23 is of triangular shape, as shown in Fig. 14, forming three guide bearings 24 which slide on the inner cylindrical surface of the bushing 16. By this construction there is formed free passages between said bearings 24 for the air pressure to pass to and from the auxiliary reservoir 20.

The guide flange 23 is provided to guide the piston rod 22 and also to move the slide valve 38 from the normal position shown in Fig. 1 to the position shown in Fig. 6. A stop 40 is provided to hold the slide valve in the normal position shown in Fig. 1. Said stop 40 rests in the guide groove 31 and is secured against displacement by a collar 42, which in this instance, is made in one piece with the stop 40. Said collar 42 is rigidly secured between the end of the bushing 16 and a casing 45 secured to the body 2. Said collar 42 forms a stop for the graduating spring plunger 46 for holding the latter in the position shown in Fig. 6, against the action of the graduating spring 47, thus limiting the distance said spring can move the piston rod 22.

The graduating spring plunger 46 has a central portion 48 which extends through the central opening of the collar 42, which portion 48 engages the guide flange 23 on the piston rod and moves said rod and graduating valve 36 into the normal position shown in Fig. 1. The collar 42, plunger 46 and casing 45, are provided with openings for the free passage of air to and from the auxiliary reservoir 20.

The piston 6 is provided with an annular flange 50 which is adapted to seal against the shoulder 52 of the bushing 3, when the piston 6 is moved, by a heavy increase of brake pipe pressure, against the action of the springs 30 and 47, with the exception of the opening formed by a restricted feed groove 51 formed in the flange 50 of the piston.

Said restricted feed groove 51 is formed by a very small groove cut radially across said flange 50. Said restricted feed groove 51 is much smaller than the feed groove 7 formed in the bushing 3, so that under a heavy brake pipe pressure the charging of the auxiliary reservoir is thus retarded by said restricted feed groove 51. This novel feature permits all the charging of the reservoir 20 to be done through the feed grooves 7 and 51 as will be more fully hereinafter described. Heretofore the retarded charging of the reservoir 20 could not be accomplished through the relatively large main feed groove 7.

The slide valve 38 is provided with a service port 55 formed through the same, which port 55 is closed by the graduating valve 36 during the charging of the reservoir 20. When it is desired to make a service application of the brakes, said service port 55 is first uncovered by a movement of the graduating valve 36, when a reduction is made in the brake pipe pressure and the auxiliary reservoir pressure moves the piston 6 into the position shown in Fig. 6. This movement of the piston 6 causes the guide flange 23 on the piston to engage the slide valve 38 and move the latter into the position shown in Fig. 6, thus causing the port 55 to register with a port 56 formed in the bushing 16 which communicates with a passageway 57 also formed in said bushing, which in turn connects with a brake cylinder port 60 formed in the body 2. Said brake cylinder port 60 communicates through a tube 61 to the brake cylinder 62, for operating the brakes in the usual manner. When the parts are in the position shown in full lines in Fig. 6, the pressure from the auxiliary chamber 20 flows through port 55 to the brake cylinder 62, thus applying the brakes.

When the brake pipe pressure reduction ceases the auxiliary reservoir pressure will continue to flow through port 55 until the reservoir pressure is enough less than the brake pipe pressure to allow the brake pipe pressure to move the piston 6 and the graduating valve 36 until the sleeve 29 takes against the slide valve 38. The slide valve 38 does not move, due to the friction on its seat caused by the pressure on top of said slide valve, and because the difference between the auxiliary reservoir pressure and the brake pipe pressure was not sufficient to overcome said friction on the slide valve. The piston 6 and graduating valve 36 have thus been moved into "service lap position", shown in dotted lines Fig. 6, closing the service port 55, and cutting off communication between the reservoir 20 and the brake cylinder, and thus holding the brakes applied.

When the piston 6 is in "service lap position" and the spring 30 has not been compressed and the sleeve 29 has not moved relatively to the piston rod 22, because the difference in the pressure in the reservoir 20 and brake pipe 12 was not sufficient to compress the spring 30, therefore the slide valve 38 has held the sleeve 29, the piston 6, and the graduating valve 36, in "service lap position", as above stated.

The brakes may be released by the brake pipe pressure being increased enough to move the piston 6 into "relief position" shown in Fig. 5, which, movement is sufficient to compress the spring 30, but not sufficient to move the slide valve 38. The slide valve 38 has a relief port 65 formed therethrough which has been uncovered by the last mentioned movement of the piston 6 and the graduating valve 36, as shown in Fig. 5. The bushing 16 has a port 66 formed through the same which registers with said relief port 65 in the slide valve when the parts are in the position shown in Fig. 5. Said bushing 16 also has a lateral opening 67 formed therein, also a radial port 68 formed therethrough, and an annular groove 69 extending partly around the outer surface of said bushing, shown in Figs. 2, 4 and 10. The body 2 has an exhaust port 70 formed therein open to the atmosphere, shown in Fig. 2.

When the parts are in the position shown in Fig. 5, the pressure from the auxiliary reservoir 20 will be relieved, or reduced, through the relief port 65, said port 66, said lateral opening 67, radial port 68, annular groove 69 and exhaust port 70. When the auxiliary reservoir pressure has been relieved sufficiently to reduce the pressure upon the slide valve 38 the friction upon the slide valve will be relieved and the auxiliary pressure will be reduced until it is less than the brake pipe pressure, when the latter pressure will move the piston 6, thus further compressing the spring 30 until the shoulder 27 on the piston takes against the slide valve 38, moving the latter into the position shown in Figs. 3 and 4 against the stop 40, thus closing communication between ports 65 and 66 as shown in dotted lines Fig. 4 thus preventing further reduction of the pressure in the auxiliary reservoir 20 to the atmosphere.

The brake cylinder pressure is exhausted through ports 60, 57 and 56 as shown in Fig. 3. The slide valve 38 is provided with an elongated recess 72 formed in its under surface, shown in Figs. 3 and 13. Said recess 72, when the slide valve is in the position shown in Fig. 3, connects the port 56 with a port 74 formed in the bushing, shown in Figs. 3 and 10.

The bushing 16 having said port 74 formed radially therethrough also has an annular groove 75 formed therein extending partly around the outer surface of the bushing, as shown in Figs. 2 and 10. The body 2 has a port 76 formed therein which communicates with a hand exhaust valve 78 mounted upon the body, as shown in Fig. 2.

The hand exhaust valve 78 consists of a casing 79 forming a chamber 80 which is closed by a valve disk 81. Said casing 79 is provided with a bushing 82 having ports 83 extending through the same. The facing surface on the lower end of the bushing 82 forms a valve seat for the disk 81, which is held against said seat by a spring 84 for closing the ports 83 in the bushing.

The casing 79 is also provided with an exhaust port 85 leading to the atmosphere, which port 85 is located above the bushing 82 and the disk 81, so that the latter may close the outlet through said port 85. The disk 81 is provided with openings 86 adapted to register with said ports 83 when the handle 87 is turned to the open position, so that the pressure may exhaust to the atmosphere, through said exhaust port 85.

When the hand valve 78 is open and the parts of the triple valve are in the positions shown in Figs. 1, 3 and 4 the pressure may exhaust from the brake cylinder 62 through ports 60, 57, 56, 72, 74, 75, 76, 86 in the disk 31, ports 83 and 85 of the hand valve and exhaust to the atmosphere.

When hand valve 78 is closed, as shown in Fig. 2, the brake cylinder pressure cannot be exhausted through the hand valve, but is controlled by the position of the graduating valve 36. The slide valve 38 is provided with an elongated groove 90 formed in its under surface, similar to the groove 72. The slide valve 38 is also provided with ports 73 and 93 extending through said valve 38 which communicate with said grooves 72 and 90 respectively, but said ports 73 and 93 do not communicate with each other when the graduating valve 36 is in the position shown in Figs. 3 and 4. When the slide valve is in the position shown in Fig. 4, the port 93 and the port 68 in the bushing 16 are in communication with the port 69, and the port 70 in the body 2 leading to the atmosphere, as shown in Fig. 2, as above described.

The brake cylinder pressure is retained in ports 73 and groove 72 by the graduating valve 36 when it is in the position shown in Figs. 3 and 4, as said ports 73 and 93 do not communicate, except through a cavity 37 formed in the graduating valve 36, shown in Figs. 1, 7 and 11.

When the parts of the triple valve are in the position shown in Fig. 1, the graduating valve cavity 37 will connect said ports 73 and 93 in the slide valve, as shown in Figs. 1 and 7, thus allowing the brake cylinder pressure to exhaust through ports 60, 57, 56, slide valve groove 72, port 73, graduating valve cavity 37, port 93 and groove 90 in the slide valve, ports 68, 69 in the bushing and port 70 in the body 2, to the atmosphere.

The slide valve 38 is provided upon its under surface with an elongated groove 64, shown in Figs. 5 and 13, for the purpose of allowing the relief ports 65 and 66 in the slide valve 38 and in the bushing 16, to remain open for a short time after the slide valve starts to move from the position shown in Fig. 5 to that shown in Fig. 4, in which latter position the slide valve has closed the port 66, thus preventing the further reduction of the pressure in the reservoir 20 to the atmosphere through said port 66.

The vent valve 95 is associated with the triple valve 1, and is connected with the brake pipe 12, and operated by the brake pipe pressure. The vent valve is provided for quickly venting the train pipe upon a sudden reduction of the pressure in the latter, which is made when an emergency application of the brakes is necessary.

The vent valve consists of a casing 96 in which is secured a bushing 97, having cylindrical end chambers 98 and 99 formed in opposite ends thereof and an intermediate chamber 100 extending between said end chambers. A piston 102 consisting of a piston rod 103 having heads 104 and 105 upon opposite ends of said rod, which heads are located in said end chambers. The central portion of the piston rod 103 is constructed to receive a vent slide valve 108 which moves longitudinally with the piston. The slide valve is provided with cheek plates 109 which embrace the rod 103. Said slide valve 108 has a facing surface which rests upon a facing surface formed in the bottom of a longitudinal groove 110 formed in the bushing 97, upon which the slide valve tightly fits for closing a vent exhaust 112 extending through the bushing 97 and also through the casing 96 to the atmosphere.

The bushing 97 is provided with a radial port 114, shown in Figs. 1, 6, 8 and 9. As shown in Figs. 8 and 9 the bushing 97 is provided with an annular groove 115, with which the port 114 connects. Said groove 115 communicates with a longitudinal groove 116 formed in said bushing 97 which communicates with the expansion chamber 99 formed in the end of the bushing 97.

Pressure is supplied from the brake pipe 12 through passageways 113, 117 formed in casing 96 and port 118 formed in the bushing 97 to the intermediate chamber 100. Said port 114 is open to receive the brake pipe pressure from the intermediate chamber 100, when the piston 102 and slide valve 108 are in the normal position, shown in Fig. 1, so that the brake pipe pressure will pass through ports 114, 115 and 116 and fill the expansion chamber 99 with a pressure equal to the brake pipe pressure. Said port 114 is only of sufficient size to allow the pressure in the chamber 99 to slowly equalize with the brake pipe pressure without moving the piston 102 except when a sudden reduction of the brake pipe pressure is made, in which case the pressure confined in the expansion chamber 99, by the restricted port 114 will act upon the piston head 105 and move the piston to the position shown in Fig. 6, in which position the vent slide valve 108 has been moved to a position to open the vent exhaust 112 to the atmosphere, allowing the brake pipe pressure to rapidly exhaust through the vent 112. The vent slide valve 108 is provided with a longitudinal groove 120 shown in Figs. 1, 2 and 6, which groove connects the port 114 with the exhaust 112 when the piston is in the emergency position shown in Fig. 6 thus allowing any excess pressure in chamber 99 to exhaust the atmosphere through port 114, groove 120 in the vent slide valve and the exhaust port 112.

When the train pipe pressure is again increased, the vent valve piston 102 will be moved to the normal position shown in Fig. 1, in which the port 114 is opened to allow the pressure to pass into expansion chamber 99 and equalize with the brake pipe pressure.

The vent valve 95 may be mounted upon the triple valve 2 as shown in Fig. 1, or the vent valve may be located separately from the triple valve and connected with the brake pipe 12 leading to the triple valve brake pipe port 14, as shown in Fig. 6.

The vent valve casing 95 shown in Figs. 1 and 2 is provided with a facing flange 125 adapted to be secured to a facing flange 126 on the triple valve. In this form the cover of the vent valve is provided with a small expansion chamber 99 which leads through a port 128 and 129 formed in the casing 96 which ports communicate with a larger pressure chamber 130 formed in the triple valve casing 2.

In the form of a vent valve shown in Fig. 6, the casing 96 is provided with a cap 132, forming an enlarged expansion chamber 133. Said cap 132 is provided with a recess 134 forming a communication with the longitudinal groove 116 in the bushing 97 leading to the port 115. The casing 96 is provided with plugs 136 and 137 for preventing pressure from the ports 129 and 117 escaping to the atmosphere. The pressure passes to and from the vent valve through brake pipe 12, which latter is also connected with the triple valve port 14, and the operation is the same as in the form shown in Fig. 1. The operation of the vent piston and vent slide valve is the same in both forms of vent valves shown in Figs. 1 and 6.

The port 114 in the vent valve is so proportioned that the air from the pressure chamber 99 may be reduced at the same rate as the brake pipe pressure is being reduced during a service application and therefore the pressure in chamber 99 will not move the piston, thus insuring the piston remaining in the position shown in Fig. 1, and eliminating all possibility of an undesirable emergency application of the brakes when only a service application was intended.

The operation of my invention is as follows:

The normal position of the triple valve and also of the vent valve are shown in Fig. 1, in which the piston 6 of the triple valve has positioned the graduating valve 36 and the slide valve 38, so that the service port 55 is closed from the brake cylinder port 60. The slide valve 38 is positioned against the stop 40 connecting the brake cylinder port 60 with the groove 72 in the slide valve which registers the port 60 with the port 74 leading to the hand exhaust valve 78. If the valve 78 is in the closed position the brake cylinder cannot exhaust through it. The slide valve also registers the exhaust port 60 with the cavity 37 in the graduating valve 36 so that the graduating valve will connect the brake cylinder port 60 with the port 93 of the slide valve which latter registers with the port 68 in the bushing which leads to the atmosphere through ports 69, in the bushing 16 and the port 70 in the body 2, shown in Fig. 2. The springs 30 and 47 tend to move the piston 6 and the parts associated therewith into the position shown in Fig. 1.

The "charging position" of the triple valve is shown in Figs. 3 and 4 and the charging position of the vent valve piston is shown in Fig. 1. Pressure is applied through the brake pipe 12 from the engine when the engine control, or brake valve, is in the charging or release position. The brake pipe pressure in the chamber 5, of the triple valve, moves the piston 6 into the position shown in Figs. 3 and 4 and the brake pipe pressure also moves the vent valve piston 102 into the position shown in Fig. 1, and fills the expansion chambers 99 and 130 through the ports 117, 118, the intermediate chamber 100, the restricted port 114, grooves 115 and 116 in the vent valve bushing 97. The vent valve piston remains in this position shown in Fig. 1 until an emergency application of the brakes is made as will be hereinafter described due to the fact that the restricted port 114 allows the pressure in the expansion chamber 99 to equalize with the brake pipe pressure except upon a sudden reduction of the latter when the piston will be moved by the pressure confined in the expansion chamber 99.

The increased or charging pressure in the brake pipe and in the pressure chamber 5 of the triple valve, after moving the piston 6, to the position shown in Figs. 3 and 4, will pass from chamber 5 through the leakage groove 7 and the restricted feed groove 51 into the auxiliary chamber 17 and into the auxiliary reservoir 20. The piston 6 compresses the springs 30 and 47 and moves the parts into the position shown in Figs. 3 and 4. The annular flange 50 on the piston is moved against the end wall of the chamber 5, so that all the pressure must pass through the small feed groove 51, in the flange 50, thus retarding the admission of the pressure to the reservoir 20 as long as the pressure in the chamber 5 is sufficiently greater than the pressure in the reservoir 20 to hold the springs 30 and 47 compressed.

The piston 6 has moved the graduating valve 36 into the position shown in Fig. 3 closing communication between the ports 73 and 93 in the slide valve 38. The charging of the reservoir 20 continues until the pressure in the latter is nearly equal to the brake pipe pressure, when the springs will then move the piston 6 and the graduating valve 36 back to the normal position shown in Fig. 1, in which the brake pipe pressure continues to flow through the leakage groove 7 until the reservoir 20 is charged to maximum pressure.

A service application of the brakes is made when the brake valve handle, on the engine, is placed in service position, causing a reduction in the brake pipe pressure. Upon a service application of the brakes the pressure is gradually reduced and therefore will not move the piston 102 of the vent valve 95 from the normal position shown in Fig. 1, thus eliminating the danger of an undesirable emergency application of the brakes. Whereas, in the forms of triple valves now in use said valves often go into an emergency application of the brakes during a service application of the brakes when an emergency application was not intended.

The reduction of the pressure in the brake pipe for effecting a service application of the brakes will also cause a reduction of pressure in the chamber 5 of the triple valve so that the pressure in the reservoir 20 will move the piston 6 into the position shown in Fig. 6.

The first movement of the piston 6 toward the service position shown in Fig. 6, closes the leakage groove 7. A further movement of the piston 6 into service position, shown in Fig. 6, moves the graduating valve 36 thus opening the service port 55 in the slide valve 38. The piston rod guide flange 23 takes against the slide valve 38 and moves it until the port 55 registers with the port 56 in the bushing 16, which communicates through ports 57 and 60 with the brake cylinder 62, thus applying the brakes by pressure flowing directly from the auxiliary reservoir 20.

"Lap position" after a service application of the brakes, the handle of the engine brake valve may be placed in lap position, closing all ports in the brake valve so that the brake pipe pressure reduction ceases and the pressure continues to flow from the reservoir 20 through ports 55, 56, 57, and 60 to the brake cylinder until the pressure in the auxiliary chamber 17 and the reservoir 20 becomes less than that of the brake pipe pressure, thus causing the piston 6 and the graduating valve 36 to move toward the auxiliary reservoir 20 until the sleeve 29 strikes against the slide valve 38, as shown in dotted lines Fig. 6. The slide valve does not move due to the friction on its seat caused by the pressure in chamber 17 on the upper side of the slide valve. As the friction of the piston 6 and the graduating valve 38 is much less than that of the slide valve 38 the difference in pressure which will move the piston and graduating valve will not be enough to move the piston together with the graduating valve 36 and slide valve 38 and also compress the spring 30 therefore the slide valve 38 will hold the piston in "lap position".

The said movement of the piston 6 into lap position, shown in dotted lines Fig. 6, caused the graduating valve 36 to close the port 55, thus cutting off any further flow of pressure from the reservoir 20 to the brake cylinder 62. This position is called lap position in the forms of triple valves now in use. In the present invention the lap position, shown in dotted lines Fig. 6 is only obtained after a service application of the brakes, therefore it is herein called, service lap position, as will be later more fully explained.

The above described lap position, up to this point, is similar to the operation of the triple valves now in use, except that in my improved valves the piston 6 and graduating valve are brought to rest against the slide valve 38, due to the resistance of the spring 30 which holds the sleeve 29 from moving upon the piston rod, thus holding the piston and graduating valve in the position shown in dotted lines Fig. 6.

Re-charging before releasing the brakes has heretofore been impossible without first releasing the brakes. In the present invention the auxiliary reservoir may be fully charged without releasing the brakes whether they have been applied by either a service or an emergency application.

The brake pipe pressure is increased when charging, as above described. The increased pressure in chamber 5 first moves the piston 6 into the position shown in Fig. 5, which is a longitudinal section through the exact center of the triple valve. The piston 6 has compressed the spring 30 so that the shoulder 27 strikes against the slide valve 38, which tends to hold the piston in the position shown in Fig. 5. The piston has moved the graduating valve 36 into a position to uncover the relief port 65 in the slide valve which latter is now registered with the port 66 in the bushing.

Said port 66 communicates through ports 67, 68 and 69 with the exhaust port 70 leading to the atmosphere, thus reducing the auxiliary reservoir pressure and reducing the friction upon the slide valve 38 and also reducing the pressure upon the auxiliary side of the piston 6. This reduction of auxiliary pressure reduces the friction upon the slide valve and permits a second or further movement of the piston 6, so that the brake pipe pressure against the piston 6 will readily move the piston together with the valves 36 and 38 into the position shown in Figs. 3 and 4 in which position the slide valve 38 has closed communication between the relief port 65 and the outlet port 66, due to the slide valve having been moved against the stop 40, thus preventing any further reduction of the auxiliary reservoir pressure through said relief ports 65 and 66.

Fig. 3 shows the slide valve 38 in the same position as Fig. 4. Fig. 3 also shows that the groove 72 in the slide valve has formed a connection between the brake cylinder port 60 and the exhaust port 74 leading to the hand valve 78, which latter is closed, preventing the exhaust pressure from the brake cylinder from going to the atmosphere through the hand valve. The graduating valve 36 is now in a position to prevent communication between the ports 73 and 93 formed in slide valve as shown in Fig. 4. Said port 93 and the groove 90 in the slide valve are at all times open to the atmosphere through the exhaust port 70. When said ports 73 and 93 are closed by the graduating valve the air from the brake cylinder port 60 is prevented from exhausting to the atmosphere and the release of the brakes is thus prevented.

When the piston 6 is in the position shown in Figs. 3 and 4 pressure from the brake pipe 12 passes through the leakage groove 7 and through the restricted groove 51 into chamber 17 and to the auxiliary reservoir 20 until the pressure in the brake pipe and auxiliary reservoir become nearly equal, when the springs 30 and 47 will move the piston 6 so as to open said restricted feed groove 51, permitting the auxiliary reservoir and brake pipe pressures to quickly equalize and move the piston into the normal position shown in Fig. 1, thus showing that the auxiliary reservoir may be recharged to a maximum pressure before releasing the brakes.

Automatic release of brakes is effected when the auxiliary reservoir is fully charged and the pressures in the auxiliary reservoir and brake pipe are equal. The piston 6 is moved by the springs to the normal position, shown in Fig. 1, as above described, and when the hand exhaust valve 78 is closed, the brakes will be automatically released because the graduating valve 36 has been moved by the piston so that the cavity 37 formed therein registers with the two ports 73 and 93, opening communication through said ports 73 and 93 from the brake cylinder to the atmosphere through ports 60, 57, 56, 73 in the slide valve through the cavity 37 in graduating valve, through port 93 and groove 90 in the slide valve and through the exhaust ports 68, 69, and 70 to atmosphere, shown in Fig. 2, thus releasing the brakes.

Release of brakes before recharging; the brakes may also be released before the auxiliary reservoir is fully charged by first placing the engine brake valve handle in full release position, thus increasing the brake pipe pressure and moving the piston 6 and the valves 36 and 38 into the position shown in Figs. 3 and 4. The brake valve handle is held in this position until all the parts of the triple valve are in the position shown in Figs. 3 and 4, then the brake valve handle is immediately moved to "lap position" so that the increase of brake pipe pressure ceases. The auxiliary reservoir pressure and the brake pipe pressure will then equalize, allowing the springs 30 and 47 to move the piston and the valve 36 into the normal position shown in Fig. 1, allowing the brake cylinder pressure to exhaust through port 70 in the same manner as described under "automatic release". The brake valve handle may now be moved to running position, thus allowing the brake pipe pressure to fully recharge the auxiliary reservoir.

Graduated release of brakes may be effected as follows: The brake valve is placed in full release position, increasing the brake pipe pressure, thus moving the piston 6 and its parts into the position shown in Figs. 3 and 4 as above described under "charging". The brake valve handle is now placed in "lap position" and the brake pipe and auxiliary reservoir pressures will equalize and the springs will move the piston 6 and graduating valve into the normal position shown in Fig. 1.

The pressure from the brake cylinder will exhaust to the atmosphere through said ports, as described under "automatic release of brakes". This exhaust through port 70 may be stopped and the balance of the pressure retained in the brake cylinder by returning the brake valve handle to full release position, which will move the piston 6 and its parts into the position shown in Figs. 3 and 4, in which the graduating valve 36 has been moved so that the cavity 37 therein no longer registers the ports 73 and 93.

Emergency application of the brakes may be obtained by a sudden and heavy reduction of the brake pipe pressure, no matter how it is caused, which reduction will actuate the triple valve into the position shown in Fig. 6 and described under the heading "service application". In addition to operating the triple valve to apply the brakes, a sudden reduction of the brake pipe pressure will cause a differential pressure upon the piston heads 104 and 105 of the vent valve 95, so that the pressure in the expansion chamber 99 of the vent valve will act upon piston head 105, because the restricted port 114 will not permit the pressure from the chamber 99 to reduce as fast as the brake pipe pressure is reduced, therefore as the pressure in chamber 99 is greater than the brake pipe pressure it will act upon piston head 105 and move the piston 102. The first movement of the piston 102 will cause the vent slide valve 108 to close the port 114, thus retaining the pressure in the chamber 99 until said pressure causes a further movement of the piston, which in turn causes the vent slide valve 108 to fully open the vent port 112 to the atmosphere, causing a rapid venting of the brake pipe pressure through the vent port 112.

When the vent slide valve 108 has been moved to the full open position the port 114 will register with the port 112 through the cavity 120 in the valve 108, thus allowing the pressure in the chamber 99 to escape to the atmosphere, so that when the brake pipe pressure is again increased, the piston 102 and also the vent slide valve 108 will readily move into the normal position, shown in Fig. 1.

Effective emergency application of the brakes after a service application of the brakes has been made: With my improved triple valve a service application of the brakes may be made as above described under the heading "service application". While the brakes are so applied an emergency application may now be made on top of the service application by first moving the brake valve handle from service position to charging position, thus recharging the auxiliary reservoir without releasing the brakes, as described under the heading "re-charging before releasing the brakes", and shown in Figs. 3 and 4. The graduating valve 36 is shown closing the exhaust ports 73 and 93 leading from the brake cylinder to the atmosphere, thus holding the service application charge in the brake cylinder until the auxiliary reservoir pressure is increased from the brake pipe. When the auxiliary reservoir pressure has increased so that it is greater than the pressure which is being retained in the brake cylinder by the graduating valve 36, the brake valve handle is then moved from "charging" to "emergency" position, moving the triple valve and vent valve into the position shown in Fig. 6, and described under the heading "emergency application of the brakes".

The pressure in the auxiliary reservoir being greater than the brake cylinder pressure, it will now flow into the brake cylinder, increasing the pressure in the latter above that which was previously obtained by the service application, above mentioned.

These last mentioned movements of the brake valve may be repeated until the pressure in the brake cylinder has increased approximately equal to the main reservoir on the locomotive.

The hand exhaust valve 78 may be used when it is desired to operate my improved triple valve in the same train with the old form of triple valves now in use, by opening the valve 78 allowing the exhaust from the brake cylinder port 60 to go direct to the atmosphere through ports 57, 56 and groove 72 in the slide valve 38, instead of being confined by the graduating valve 36, as explained under the heading "graduated release". When the hand exhaust valve 78 is used in the open position, my improved triple valve may be operated as an ordinary triple valve.

The hand exhaust valve 78 may be used as a bleed valve for the brake cylinder pressure in case the triple valve should be inoperative from any cause, thus releasing the brakes by opening the hand exhaust valve. The hand exhaust valve may also be used in a train equipped with my novel triple valves, by opening the hand exhaust valves on some cars on the rear end of the train and closing those on the remaining cars of the train, so that the brakes on the rear cars with the hand valves open, may be released automatically in advance of the other brakes on the other cars having the hand valves closed, so that my novel triple valves may be utilized for obtaining a graduated release of the brakes throughout the other cars in the train, in which the hand exhaust valves are in the closed position.

I claim:—

1. A triple valve having a body forming a brake pipe pressure chamber and an auxiliary chamber, a piston controlling communication between said chambers, a piston rod on said piston located in said auxiliary chamber, a graduating valve on said rod, said body having a brake cylinder port formed therein controlled by said graduating valve, said body having an exhaust port formed therein leading to the atmosphere, and a spring associated with the piston against the action of which the piston is moved when the pressure in said pressure chamber is greater than the pressure in the auxiliary chamber thus moving the graduating valve into a position to close communication between the brake cylinder port and said exhaust port.

2. A triple valve having a body forming a brake pipe pressure chamber and an auxiliary chamber, a piston controlling communication between said chambers, a piston rod on said piston located in said auxiliary chamber, a graduating valve on said rod, said body having a brake cylinder port formed therein controlled by said graduating valve, said body having an exhaust port formed therein leading to the atmosphere controlled by said graduating valve, said graduating valve having a groove formed therein adapted to form a communication between said brake cylinder port and said exhaust port, and a spring to move said graduating valve into a position to register said brake cylinder port and said exhaust port through said groove in the graduating valve when the pressures in said chambers are equal and open the said exhaust port from the brake cylinder port to the atmosphere.

3. A triple valve having a body forming a brake pipe pressure chamber and an auxiliary chamber, a piston controlling communication between said chambers, a piston rod on said piston located in said auxiliary chamber, a graduating valve on said rod, said body having a brake cylinder port formed therein controlled by said graduating valve, said body having an exhaust port formed therein leading to the atmosphere, a spring associated with the piston against the action of which the piston will be moved by pressure in said pressure chamber when the pressure is greater than the pressure in the auxiliary chamber and move the graduating valve into a position to close communication between the brake cylinder port and said exhaust port, and said graduating valve having a groove formed therein adapted to form a communication between said brake cylinder port and said exhaust port when said piston is moved by said spring into a normal position when the pressures in said chambers are equal and open said exhaust port from the brake cylinder to the atmosphere.

4. A triple valve having a body forming a brake pipe pressure chamber and an auxiliary chamber, a piston slidably mounted in said pressure chamber, said body having a longitudinal leakage groove formed therein extending throughout a portion of the length of the pressure chamber through which groove pressure may pass around said piston to the auxiliary chamber, said body having a transverse wall against which the piston will seat when moved to the end of its stroke toward said auxiliary chamber, said wall and said piston having a restricted passageway formed between them of smaller capacity than said leakage groove forming a restricted communication between said leakage groove and said auxiliary chamber when the piston has been moved to the end of its stroke against said wall by a greater pressure in the pressure chamber than in the auxiliary chamber, and a spring operatively associated with the piston for moving the latter away from said wall when the pressures in said pressure chamber and said auxiliary chamber are nearly equal.

5. A triple valve having a body forming a brake pipe pressure chamber and an auxiliary chamber, a piston slidably mounted in said pressure chamber, said body having a longitudinal leakage groove formed therein extending throughout a portion of the length of the pressure chamber through which groove pressure may pass around the piston, said body having a transverse wall forming the end of the chamber in which the piston is mounted adjacent to the auxiliary chamber, an annular flange formed upon the periphery of the piston adapted to seat against said wall whereby the opposite faces of the piston will present nearly equal areas to the pressure chamber and to the auxiliary chamber when the piston is seated against said wall, said flange having a groove formed therein which is relatively smaller than said leakage groove forming a restricted passageway from the leakage groove to the auxiliary chamber when the piston is seated at the end of its stroke against said wall by a greater pressure in the pressure chamber than in the auxiliary chamber, and a spring operatively associated with the piston for moving the latter away from said wall to fully open said leakage groove when the pressures in said pressure chamber and said auxiliary chamber are nearly equal.

6. A triple valve having a body forming a brake pipe pressure chamber and an auxiliary chamber, a piston operatively mounted between said chambers, a piston rod on said piston located in said auxiliary chamber, a graduating valve on said rod, a slide valve located in said auxiliary chamber upon which the graduating valve is movably seated, said piston having stops thereon to move said slide valve, said body having a brake cylinder port, said slide valve having a service port through which pressure is admitted to said brake cylinder port from the auxiliary chamber when the piston is moved by the auxiliary chamber pressure upon a reduction of pressure in the brake pipe pressure chamber, said slide valve having a second port formed therethrough which registers with said brake cylinder port when the slide valve is moved by the piston by increased brake pipe pressure, said slide valve having a third port formed therethrough, said graduating valve having a cavity formed therein forming a communication between said second and third ports when the piston is in the normal position due to the pressure in the brake pipe pressure chamber and auxiliary chamber becoming equal, and said body having an exhaust port formed therein forming a communication between said third port in the slide valve and the atmosphere.

7. A triple valve having a body forming a brake pipe pressure chamber and an auxiliary chamber, a piston operatively mounted between said chambers, a piston rod on said piston located in said auxiliary chamber, a graduating valve on said rod, a slide valve located in said auxiliary chamber upon which the graduating valve is movably seated, said rod having stops thereon to move said slide valve, said body having a brake cylinder port, said slide valve having a service port through which pressure is admitted to said brake cylinder port from the auxiliary chamber when the piston is moved by a reduction of presure in the brake pipe pressure chamber, said slide valve having a second port formed therethrough which registers with said brake cylinder port when the slide valve is moved by the piston by increased pressure in said pressure chamber, said slide valve having a third port formed therethrough so positioned that it will not register with said brake cylinder port, said graduating valve having a cavity formed therein forming a communication between said second and third ports of said slide valve when the graduating valve is moved by the piston into the normal position due to the brake pipe and auxiliary chamber pressure becoming equal, and said body having an exhaust port formed therein forming a communication between said third port of the slide valve and the atmosphere.

8. A triple valve having a body forming a pressure chamber and an auxiliary chamber, a brake pipe connected with said pressure chamber, a piston operatively mounted between said chambers, a piston rod on said piston located in said auxiliary chamber, a graduating valve on said rod, a slide valve upon which the graduating valve is movably seated, said rod having stops thereon to move said slide valve, said body having a brake cylinder port, said slide valve having a service port through which pressure is admitted to said brake cylinder port from the auxiliary chamber when the piston is moved by a reduction of pressure in the brake pipe, said slide valve having a second port formed therethrough which registers with said brake cylinder port when the slide valve is moved by the piston by increased brake pipe pressure, said slide valve having a third port formed therethrough so positioned that it will not register with said brake cylinder port, said graduating valve having a cavity formed therein forming a communication between said second and third ports of said slide valve when the graduating valve is moved by the piston into the normal position due to the brake pipe and auxiliary chamber pressure becoming equal, said body having an exhaust port formed therein forming a communication between said third port of the slide valve and the atmosphere, and said graduating valve having a facing surface in contact with the slide valve for closing communication between said second and third ports in the slide valve when the piston is moved by increased brake pipe pressure into the charging position.

9. A triple valve having a body forming a brake pipe pressure chamber and an auxiliary chamber, a piston operatively mounted between said chambers, a piston rod on said piston located in said auxiliary chamber, a graduating valve on said rod, a slide valve upon which the graduating valve is movably seated, said rod having stops thereon to move said slide valve, said body having a brake cylinder port, said slide valve having a service port through which pressure is admitted to said brake cylinder port from the auxiliary chamber when the piston is moved by a reduction of pressure in said pressure chamber, said slide valve having a second port formed therethrough which registers with said brake cylinder port when the slide valve is moved by the piston by an increase of pressure in the pressure chamber, said slide valve having a third port formed therethrough so positioned that it will not register with said brake cylinder port, said graduating valve having a cavity formed therein forming a communication between said second and third ports of said slide valve when the graduating valve is moved by the piston into the normal position, and a spring to move said rod and the graduating valve into the normal position relatively to the slide valve to register said second and third ports thus opening communication between the brake cylinder port and the atmosphere when the pressure in said chambers are equal.

10. A triple valve having a body forming a pressure chamber and an auxiliary chamber, a brake pipe connected with the pressure chamber, a piston operatively mounted between said chambers, a piston rod on said piston located in said auxiliary chamber, a graduating valve on said rod, a slide valve located in said auxiliary chamber, said rod having stops thereon to move said slide valve, said body having a brake cylinder port, said slide valve having a service port through which pressure is admitted to said brake cylinder port from the auxiliary chamber when the piston is moved by a reduction of pressure in the brake pipe, said slide valve having a second port formed therein which registers with said brake cylinder port when the piston is moved by increased brake pipe pressure, said slide valve having a third port formed therethrough, a spring tending to move the piston into a normal position when the pressures in the auxiliary chamber and brake pipe are equal, said graduating valve having a cavity formed therein forming a communication between said second and third ports when the piston is in the normal position, and said body having an exhaust port formed therein forming a communication between said third port of the slide valve and the atmosphere.

11. A triple valve having a body forming a pressure chamber and an auxiliary chamber, a brake pipe connected with said pressure chamber, a piston operatively mounted between said chambers, a piston rod on said piston located in said auxiliary chamber, a graduating valve on said rod, a slide valve located in said auxiliary chamber, said rod having stops thereon to engage said slide valve, said body having a brake cylinder port, said slide valve having a service port through which pressure is admitted to said brake cylinder port from the auxiliary chamber when the piston is moved by a reduction of pressure in the brake pipe, said slide valve having a second port formed therein which registers with said brake cylinder port when the piston is moved by increased brake pipe pressure, said slide valve having a third port formed therethrough, a plunger slidably mounted in the body for engaging the piston, a spring tending to move the plunger toward said piston to return the piston to the normal position when the pressures in the auxiliary chamber and brake pipe are equal, a stop upon the body to limit the movement of the plunger by the action of the spring, said graduating valve having a cavity formed therein forming a communication between said second and third ports when the piston is in the normal position, and said body having an exhaust port formed therein forming a communication between said third port of the slide valve and the atmosphere.

12. A triple valve comprising a body forming a pressure chamber and an auxiliary chamber, said body having a brake cylinder port formed therein, a slide valve for controlling said port leading to the brake cylinder, a graduating valve operatively associated with the slide valve, a piston operatively mounted between said chambers, a piston rod secured on the piston upon which the graduating valve is mounted, a flange on the end of said rod opposite to the piston for engaging the slide valve, a plunger for engaging the end of said rod opposite to the piston, a guide casing upon said body, a guide member slidably mounted in said casing, said plunger forming an extension upon said guide member, a spring tending to move said guide member toward said piston, a stop upon the body to limit the movement of the guide member by the action of said spring by which movement of the spring the piston and the graduating valve will be moved to a normal position when the pressures in said chambers are equal, and said body having an exhaust port formed therein leading to the atmosphere and controlled by said slide valve and graduating valve.

13. A triple valve having a body forming a brake pipe pressure chamber and an auxiliary chamber, a piston operatively mounted between said chambers, a piston rod on said piston located in said auxiliary chamber, a graduating valve on said rod, a slide valve located in said auxiliary chamber, said piston rod having stops thereon to engage said slide valve, said body having a brake cylinder port, said slide valve having a service port through which pressure is admitted to said brake cylinder port from the auxiliary chamber when the piston is moved by a reduction of pressure in said pressure chamber, a member slidably mounted upon said rod located between the slide valve and the piston, and a spring between said member and the piston tending to move said member away from the piston, said spring having sufficient tension to stop the piston and graduating valve in lap position when said member takes against the slide valve without moving the latter from service position but allowing the graduating valve to close said service port in the slide valve, thus closing communication through said brake cylinder port.

14. A triple valve having a body forming a brake pipe pressure chamber and an auxiliary chamber, a piston operatively mounted between said chambers, a piston rod on said piston located in said auxiliary chamber, a graduating valve on said rod, a slide valve located in said auxiliary chamber, said slide valve having a relief port formed through the same, said body having an exhaust port leading to the atmosphere with which said relief port in the slide valve registers when in service position, said graduating valve adapted to close said relief port in the slide valve when the graduating valve and piston are in service and lap positions, a member slidably mounted upon said rod located between the slide valve and the piston, a spring between said member and the piston tending to move said member away from the piston and yield when said member takes against the slide valve due to a movement of the piston toward the slide valve under an increased brake pipe pressure, without moving the slide valve, allowing the graduating valve to move from service or lap position into auxiliary chamber pressure relief position in which latter position the graduating valve has opened said relief port exhausting the auxiliary chamber pressure to the atmosphere.

15. A triple valve having a body forming a brake pipe pressure chamber and an auxiliary chamber, a piston operatively mounted between said chambers, a piston rod on said piston located in said auxiliary chamber, a graduating valve on said rod, a slide valve located in said auxiliary chamber, said slide valve having a relief port through the same, said body having an exhaust port leading to the atmosphere with which said relief port in the slide valve registers when in service position, said graduating valve adapted to close said relief port in the slide valve when the graduating valve and piston are in service and lap positions, a member slidably mounted upon said rod located between the slide valve and the piston tending to move said member away from the piston and yield when said member takes against the slide valve due to a movement of the piston under an increased brake pipe pressure without moving the slide valve allowing said graduating valve to move from service or lap position into auxiliary chamber relief position in which latter position the graduating valve has opened said relief port, said slide valve having a longitudinal extension groove formed therein upon the lower surface thereof for connecting the relief port in the slide valve with the exhaust port in the body whereby the slide valve may have a movement after the reduction of the auxiliary chamber pressure through the relief port in the slide valve without cutting off said groove in the slide valve from said exhaust port in the body during the initial movement of the slide valve by the further movement of the piston toward charging position, in which latter position said exhaust port in the body is closed by the final movement of the slide valve into charging position.

16. A triple valve comprising a body forming a brake pipe pressure chamber and an auxiliary chamber, said body having a brake cylinder port and an exhaust port formed therein leading to the atmosphere, a slide valve for controlling said ports, a graduating valve operatively associated with the slide valve, a piston operatively mounted between said chambers, a piston rod secured on the piston upon which the graduating valve is mounted, a flange on the opposite end of said rod opposite to the piston for engaging the slide valve, a sleeve member on said rod located between the slide valve and the piston, a spring between said member and the piston tending to move said member away from the piston, a stop on the piston rod to limit the movement of said member by the spring, and a shoulder on the slide valve against which said member takes for holding the piston and graduating valve relatively to the slide valve when the brake pipe and auxiliary chamber pressures are equal.

17. A triple valve having a body forming a brake pipe pressure chamber and an auxiliary chamber, a piston operatively mounted between said chambers, a piston rod on said piston located in said auxiliary chamber, a graduating valve on said rod, a slide valve located in said auxiliary chamber, said piston having stops thereon to move said slide valve, said body having a brake cylinder port, said slide valve having a service port through which pressure is admitted to said brake cylinder port from the auxiliary chamber when the piston is moved by a reduction of pressure in the brake pipe chamber, said slide valve having a second port formed therethrough which registers with said brake cylinder port when the piston is moved by increased brake pipe pressure, said slide valve having a groove formed in the under surface thereof forming an elongated cavity in communication with said second port, said slide valve having a third port formed therethrough, said slide valve having a groove formed in the under surface thereof forming an elongated cavity in communication with said third port, a graduating valve slidably mounted upon the slide valve for controlling communication between said second and third ports, said graduating valve having a cavity formed therein forming a communication between said second and third ports when the piston is in the normal position, and said body having two independent exhaust ports formed therein, one of which is in communication with said second port and the other is in communication with said third port of the slide valve.

18. A triple valve having a body forming a pressure chamber and an auxiliary chamber, a piston operatively mounted between said chambers, a piston rod on said piston located in said auxiliary chamber, a graduating valve on said rod, a slide valve located in said auxiliary chamber, said slide valve having a relief port formed through the same, said body having an exhaust port leading to the atmosphere with which said relief port in the slide valve registers when the slide valve is in service position, said graduating valve adapted to close said relief port in the slide valve when the graduating valve and piston are in service and lap positions, and means upon the piston for moving the slide valve into a position to automatically close said exhaust port in the body when the piston is moved by a reduction of pressure through said relief port from the auxiliary chamber to the atmosphere.

19. A triple valve having a body forming a pressure chamber and an auxiliary chamber, a piston operatively mounted between said chambers, a piston rod on said piston located in said auxiliary chamber, a graduating valve on said rod, a slide valve located in said auxiliary chamber, said piston having stops thereon to move said slide valve, said body having a brake cylinder port, said slide valve having a service port through which pressure is admitted to said brake cylinder port from the auxiliary chamber when the piston is moved by a reduction of pressure in the pressure chamber, said slide valve having a second port formed therein which registers with said brake cylinder port when the piston is moved by increased brake pipe pressure, said body having an exhaust port formed therein in communication with said second port in the slide valve, a hand exhaust valve, and a connection between said hand exhaust valve and said exhaust port formed in the body through which the brake cylinder exhaust pressure may be retarded by the hand valve when the slide valve is in release position registering the brake cylinder port with said exhaust port in the body.

20. A triple valve having a body forming a pressure chamber and an auxiliary chamber, a piston operatively mounted between said chambers, a piston rod on said piston located in said auxiliary chamber, a graduating valve on said rod, a slide valve located in said auxiliary chamber, said piston having stops thereon to move said slide valve, said body having a brake cylinder port, said slide valve having a service port through which pressure is admitted to said brake cylinder port from the auxiliary chamber when the piston is moved by a reduction of pressure in the pressure chamber, said slide valve having a second port formed therein which registers with said brake cylinder port when the piston is moved by increased brake pipe pressure, said slide valve having a third port formed therethrough, said graduating valve having a cavity formed therein forming a communication between said second and third ports when the piston is in the normal position due to the brake pipe and auxiliary chamber pressure becoming equal, said body having an exhaust port formed therein forming a communication between said third port in the slide valve and the atmosphere, said body having a second exhaust port formed therein communicating with said second port in the slide valve, a hand exhaust valve, and a connection between said hand valve and said second exhaust port formed in the body through which the brake cylinder pressure may exhaust through said hand valve when the latter is open, or when said hand valve is closed the brake cylinder exhaust pressure must pass through said third port in the slide valve controlled by the graduating valve to the atmosphere.

21. A triple valve having in combination a brake pipe operatively associated therewith, a vent valve casing having end chambers forming a brake pipe chamber and an expansion chamber at opposite ends of said casing, an intermediate chamber extending between said end chambers, a connection between said brake pipe and said brake pipe chamber, a piston having a rod extending through said intermediate chamber carrying heads upon opposite ends thereof located in said chambers formed at opposite ends of the casing, said casing having a port formed therein leading from the brake pipe chamber to said intermediate chamber, said casing having a restricted port formed therein forming a communication between said intermediate chamber and said expansion chamber, said casing having an exhaust port formed therein leading from the intermediate chamber to the atmosphere, a slide valve located in said intermediate chamber and movable by the piston to close said vent exhaust port by pressure in the brake pipe chamber acting upon the piston, said slide valve having a facing surface for closing said restricted port upon the initial return movement of the piston by the pressure confined in the expansion chamber, and said slide valve having a groove formed therein adapted to register said restricted port with said vent exhaust port when the slide valve is moved to the end of its stroke by the pressure confined in the expansion chamber.

22. A triple valve having a body provided with a brake pipe port, said body having a facing surface thereon, said body having a recess formed therein forming an enlarged expansion chamber surrounded by said facing surface, a vent casing secured upon said facing surface closing said chamber, said vent casing having a brake pipe chamber formed therein communicating with the brake pipe port in said body, a brake pipe operatively connected with said brake pipe chamber in said casing, said vent casing having a port forming a communication between said expansion chamber in said body with an expansion chamber formed in the vent casing located at the opposite end of the casing from the brake pipe chamber, said vent casing having an intermediate chamber extending between said chambers located at the opposite ends of said casing, a piston having a rod extending through said intermediate chamber carrying heads upon opposite ends, thereof located in said chambers formed at opposite ends of the casing, said casing having a port formed therein leading from the brake pipe chamber to said intermediate chamber, said casing having a restricted port formed therein forming a communication between said intermediate chamber and said expansion chamber, said casing having an exhaust port formed therein leading from the intermediate chamber to the atmosphere, a slide valve located in said intermediate chamber and movable by the piston to close said vent exhaust port by pressure in the brake pipe chamber acting upon the piston, said slide valve having a facing surface for closing said restricted port upon the initial return movement of the piston by the pressure confined in the expansion chamber, and said slide valve having a groove formed therein adapted to register said restricted port with said vent exhaust port when the slide valve is moved to the end of its stroke by the pressure confined in the expansion chamber.

23. In a triple-valve having piston operated means for effecting the ordinary operation of application, release and recharging, the combination of means operable upon increase of brake-pipe pressure for totally preventing escape of air from the brake cylinder, and means operable upon lapping of brake-pipe pressure for releasing brake cylinder air, said retaining and releasing means being operable at any brake-pipe pressure at the will of the operator whereby a graduated release may be effected.

24. In a triple valve having piston-operated means for effecting the ordinary operations of application, release and recharging, the combination of means operable upon increase of brake-pipe pressure for totally preventing escape of air from the brake cylinder, and means operable upon lapping of brake-pipe pressure for releasing brake cylinder air, said retaining and releasing means being controlled by the triple-valve piston.

25. In a triple valve having a piston-controlled valve for effecting the usual triple-valve functions the combination of means for totally retaining brake cylinder pressure at any brake pipe pressure during recharging of the auxiliary, and means for introducing increased pressure into the brake cylinder from the recharged auxiliary reservoir to effect an emergency braking pressure.

26. In a triple valve having a piston-controlled valve for effecting the usual triple-valve functions the combination of means for totally retaining brake cylinder pressure at any brake pipe pressure during recharging of the auxiliary reservoir, and means for introducing increased pressure into the brake cylinder from the recharged auxiliary reservoir to effect an emergency braking pressure, both said means being controlled by brake-pipe pressure.

27. In an air-brake system comprising a train pipe and a plurality of triple valves, a device for locally venting the train pipe at each triple valve upon a sudden reduction in train-pipe pressure including in combination a slide valve controlling an atmospheric vent from the train pipe, a closed chamber, a piston subject on one side to train pipe pressure and on the other side to that of the closed chamber for controlling the movement of the valve, the piston being actuated solely by the varying air pressures in the train pipe and closed chamber, and means associating the valve with the piston whereby the valve is movable laterally of the piston toward vent closing position by train pipe pressure.

28. In an air-brake system comprising a train pipe and a plurality of triple valves, a device for locally venting the train pipe at each triple valve upon a sudden reduction in train-pipe pressure including in combination a slide valve controlling an atmospheric vent from the train pipe, a closed chamber, and a piston subject on one side to train pipe pressure and on the other side to that of the closed chamber for controlling the movement of the valve, the piston being actuated solely by the varying air pressures in the train pipe and closed chamber, a casing in which the piston is slidably mounted and means permitting lateral movement of the valve relatively to the piston whereby the valve is urged against the casing by train pipe pressure for preventing movement of the piston during service reductions of pressure in the train pipe.

29. In an air-brake system comprising a train pipe and a plurality of triple valves, a device for locally venting the train pipe at each triple valve upon a sudden reduction in train-pipe pressure including in combination a slide valve controlling an atmospheric vent from the train pipe, a closed chamber, and a piston subject on one side to train pipe pressure and on the other side to that of the closed chamber for controlling the movement of the valve, the piston being actuated solely by the varying air pressures in the train pipe and closed chamber, and said device having an atmospheric vent from the closed chamber normally closed by said valve and opened by the latter for reducing pressure in the closed chamber while the piston is in train pipe venting position to permit return of the piston to non-venting position.

30. In a triple valve control mechanism including a pressure-controlled valve, brake-pipe, auxiliary-reservoir and brake-cylinder connections for effecting the ordinary type valve operations of application, releasing and recharging, the combination of means embodied as an integral part of the triple valve structure for totally preventing escape of brake-cylinder pressure while the auxiliary reservoir is being recharged, and means for automatically releasing the brake-cylinder pressure when the auxiliary reservoir pressure equalizes with that of the brake pipe.

31. In a triple-valve control mechanism including a piston subject to train-pipe and auxiliary reservoir pressures on opposite sides thereof, a valve controlled by the piston for controlling connections to auxiliary reservoir and brake cylinder to effect the standard triple-valve operations, the combination of means controlled by the piston for totally preventing escape of brake cylinder air while the auxiliary reservoir is being recharged at any train pipe pressure.

32. In a triple-valve control mechanism including a piston subject to train-pipe and auxiliary reservoir pressures on opposite sides thereof, a valve controlled by the piston for controlling connections to auxiliary reservoir and brake cylinder to effect the standard triple-valve operations, the combination of means controlled by the piston for totally preventing escape of brake cylinder air while the auxiliary reservoir is being charged, and means for releasing the brake cylinder air when the pressure in the auxiliary reservoir equalizes with that of the train pipe.

33. In a triple-valve control mechanism including a piston subject to train-pipe and auxiliary reservoir pressures on opposite sides thereof, a valve controlled by the piston for controlling connections to auxiliary reservoir and brake cylinder to effect the standard triple-valve operations, the combination of a valve controlled by the piston and movable to totally cut off escape of air from the brake cylinder while the auxiliary reservoir is being recharged, and means for returning the valve to release position when the auxiliary reservoir pressure becomes substantially equal to that of the train pipe.

34. In a triple-valve control mechanism including a piston subject to train-pipe and auxiliary reservoir pressures on opposite sides thereof, a valve controlled by the piston for controlling connections to auxiliary reservoir and brake cylinder to effect the standard triple-valve operations, the combination of a valve constituting an integral part of the triple-valve structure and movable to totally prevent escape of brake-cylinder air whenever the pressure in the train pipe exceeds that in the auxiliary reservoir, said valve being normally returnable to release position when train pipe and auxiliary reservoir pressures are equalized.

35. In a triple-valve control mechanism including a piston subject to train-pipe and auxiliary reservoir pressures on opposite sides thereof, a slide-valve controlled by the piston for controlling connections to auxiliary reservoir and brake cylinder to effect the standard triple-valve operations, the combination of a graduating valve controlled by the piston and associated with the slide-valve for totally preventing escape of brake-cylinder air during recharging of the auxiliary reservoir, and means for moving the graduating valve relative to the slide-valve to release the brakes when the train pipe and auxiliary reservoir pressures equalize.

36. In a triple-valve control mechanism including a piston subject to train-pipe and auxiliary reservoir pressures on opposite sides thereof, a slide-valve controlled by the piston for controlling connections to auxiliary reservoir and brake cylinder to effect the standard triple-valve operations, the combination of a graduating valve controlled by the piston and associated with the slide-valve for totally preventing escape of brake-cylinder air during recharging of the auxiliary reservoir, and means for moving the graduating valve relative to the slide-valve to release the brakes when the train pipe and auxiliary reservoir pressures equalize at any pressure in the system.

THOMAS JAMES, Jr.